UNITED STATES PATENT OFFICE.

OTTO BEST, CHARLES S. ASH, AND EDGAR SAMSON, OF SAN FRANCISCO, CALIFORNIA.

BAKING-POWDER AND PROCESS OF MAKING THE SAME.

No. 856,673.  Specification of Letters Patent.  Patented June 11, 1907.

Application filed September 6, 1905. Serial No. 277,256.

*To all whom it may concern:*

Be it known that we, OTTO BEST and CHARLES S. ASH, citizens of the United States, and EDGAR SAMSON, a subject of the King of Great Britain, residing at San Francisco, in the county of San Francisco and State of California, have invented certain new and useful Improvements in Baking-Powder and Processes of Making the Same, of which the following is a specification.

Several organic and a few inorganic acid salts, as for instance tartaric acid, citric acid and some phosphates, have many desirable qualities as ingredients in baking powder but have heretofore either not been used at all, or not considerably, on account of the baking powder made from these ingredients being too unstable, due to their ready solubility and also on account of such baking powder being from the same cause too rapid in its action, performing the leavening process too quickly to make a desirable finished product.

The object of the present invention is to provide a baking powder in which such ingredients may be used which shall yet be stable and which shall also be reluctant in its action, thus permitting the dough to rise slowly and gradually.

The theoretical explanation of this process is based on the following facts: Coagulated albumen is insoluble in water, but soluble in caustic soda, forming an alkaline solution of coagulated albumen. From this alkaline solution, the albumen is precipitated again by most acids present in solution in sufficient quantities to neutralize the alkali that holds the coagulated albumen in solution. In other words:—Adding to the alkaline solution of albumen, made from coagulated albumen, the necessary quantity of an acid, brings the albumen, held in solution by the alkali back again in an insoluble form. The solution of coagulated albumen in caustic alkali will hereafter be spoken of as "alkaline albumen." This reaction of precipitating, from a solution of "alkaline albumen," insoluble albumen is made use of for coating certain acid ingredients, otherwise, or in unrestrained state not suitable for baking powder and thereby made suitable for that purpose.

The practical carrying out of this process is as follows:—We coagulate a 12% solution of albumen about 4 c. c. by the application of heat and dissolve it again in a small excess of a 10% caustic soda solution (about 0. 3 c. c.) and obtain the "alkaline albumen" above referred to. We then take a certain amount of starch (or other filler) say 20 g. and add to it, say, 4 c. c. of the "alkaline albumen" and mix well. We thus get a semi-dry mixture. We can obtain a more or less wet mixture, by adding more or less of the "alkaline albumen." By this method we coat the minute particles of starch with a soluble film of "alkaline albumen." We can obtain a thicker or thinner film by using a stronger or weaker solution of "alkaline albumen." When perfectly mixed, we add to this mixture, say, 26 g. of dry, powdered tartaric acid and mix again. Wherever a particle of tartaric acid is touched by a particle of starch, surrounded by "alkaline albumen" a small amount of tartaric acid is dissolved by the moisture, and chemical reaction takes place at the point of contact, by which the albumen at that particular point is precipitated, and this particle of starch, by means of the coagulated albumen is attached to the surface of the tartaric acid. Through renewed stirring, new surfaces of tartaric acid are thus exposed to the minute particles of starch coated with "alkaline albumen" and further covering of tartaric acid with the coated starch particles takes place. As coagulation of the film around the starch cannot take place between the starch particles themselves, but only when touched by particles of tartaric acid, this coating of tartaric acid with coated starch keeps on as long as coated starch particles still find particles of tartaric acid with unprotected surface.—In this process sufficient moisture must be present to dissolve enough of the tartaric acid to neutralize the alkali of the "alkaline albumen" and precipitate the latter. The mixture is then dried at a low temperature (135 degrees F.) under constant agitation. We now have the particles of tartaric acid coated with a dry insoluble film, consisting of a mixture of starch, and coagulated albumen.

We do not limit ourselves to any particular acid or acid salt, as this process can of course be applied to any substance, suitable as an acid ingredient, but too violent in its unrestrained action.

The tartaric acid thus prepared is mixed with the necessary quantity of bicarbonate in the usual manner, with or without additional filler, according to the strength desired.

In the use of this baking powder the thin film of starch and albumen (of the above description) which is coagulated upon the particles of the acid ingredients, is not dissolved by the action of hot or cold water, but is mechanically detached when a sufficient quantity of water is permitted access thereto.

It is an important feature of the present invention that the removal of the film takes place gradually, permitting the baking powder to perform its function slowly, and in proportion to the raising of the temperature.

It is a desired advantage in the use of all baking powders that the escape of the gas should be slow and substantially continuous with the baking process, thus permitting the dough to rise slowly and gradually, and this is accomplished by our invention.

We claim:—

1. The process of making baking powder which consists in coagulating albumen, treating the same with a solution of caustic alkali to produce a solution of "alkaline albumen", adding the product to a filler, and commingling the same, adding the necessary quantity of tartaric acid, thoroughly mixing to neutralize the alkali in the "alkaline albumen" by part of said acid and thereby attaching the coated filler by means of the coagulated albumen to the remaining tartaric acid, heating the mixture in a comminuted form to create dry insoluble films around the individual particles of the tartaric acid, and then mixing it with the alkaline ingredient in the usual manner, substantially as described.

2. The process of making baking powder which consists in coagulating albumen, treating the same with a solution of caustic alkali to produce a solution of "alkaline albumen", adding the product to a filler, and commingling the same, adding the necessary quantity of an acid ingredient, thoroughly mixing to neutralize the alkali in the "alkaline albumen" by part of said acid and thereby attaching the coated filler by means of the coagulated albumen to the remaining acid ingredient, heating the mixture in a comminuted form to create dry insoluble films around the individual particles of the acid ingredient, and then mixing it with the alkaline ingredient in the usual manner, substantially as described.

3. A baking powder having the particles of its acid ingredient coated with a dry, insoluble film but mechanically detachable by the action of water, and consisting of starch and coagulated albumen, substantially as described.

4. A baking powder having particles of tartaric acid coated with a dry, insoluble film, but mechanically detachable by the action of water and consisting of starch and coagulated albumen, substantially as described.

In witness whereof we have hereunto set our hands in the presence of two subscribing witnesses.

OTTO BEST.
CHARLES S. ASH.
EDGAR SAMSON.

Witnesses:
 FRANCIS M. WRIGHT,
 E. WOODWARD.